US005833390A

United States Patent [19]

Lovett

[11] Patent Number: 5,833,390

[45] Date of Patent: Nov. 10, 1998

[54] FLUID STORAGE AND DELIVERY SYSTEM

[76] Inventor: Jerry Lovett, P.O. Box 1563, Cottonwood, Ariz. 86326

[21] Appl. No.: 768,767

[22] Filed: Dec. 17, 1996

[51] Int. Cl.[6] .............................. B65G 5/00; B67D 5/60; E02D 3/00

[52] U.S. Cl. .............................. 405/52; 141/86; 405/128

[58] Field of Search .............................. 405/52, 53, 128, 405/54; 141/86, 59

[56] References Cited

U.S. PATENT DOCUMENTS

| | | |
|---|---|---|
| 4,682,911 | 7/1987 | Moreland . |
| 4,787,772 | 11/1988 | Wagner . |
| 4,818,151 | 4/1989 | Moreland . |
| 4,934,866 | 6/1990 | Gage . |
| 4,978,249 | 12/1990 | Killman . |
| 5,030,033 | 7/1991 | Heintzelman . |
| 5,209,603 | 5/1993 | Morgan . |
| 5,390,713 | 2/1995 | Fiech .................................... 141/86 X |
| 5,421,671 | 6/1995 | Lewis . |
| 5,495,695 | 3/1996 | Elliott . |
| 5,586,586 | 12/1996 | Fiech .................................... 405/52 X |

*Primary Examiner*—Dennis L. Taylor
*Attorney, Agent, or Firm*—LaValle D. Ptak

[57] ABSTRACT

A below-grade fuel delivery and storage system is constructed in the form of a fully vaulted system located under the dispenser area. The vault is made of concrete; and all of the plumbing, fill, vapor recovery locations and the bulk storage tank itself are located entirely within the vault. The fill pipes for tanks located within the vault extend through openings in the roof of the vault. Similarly, fuel delivery lines extend from the tanks upwardly through openings in the vault roof to dispensers located directly above the vault.

17 Claims, 3 Drawing Sheets

FLUID STORAGE AND DELIVERY SYSTEM

BACKGROUND

A significant source of ground water contamination has developed as a result of leaks in underground tanks and lines used in the storage and delivery of fluid hydrocarbon products, such as gasoline, diesel fuel, heating oil and the like. In the past, large underground bulk storage tanks, usually made of steel, were directly buried in the ground, with appropriate filler pipes and fuel delivery lines also being buried in the ground. Through corrosion or faulty installation, leaks occur in both the tanks and in the fill lines and delivery lines, contributing substantially to ground water contamination and soil contamination. Systems of this type have been widely used for storing and delivering gasoline at automobile service stations.

As the tanks and fill and delivery lines deteriorate, leaks frequently develop which are relatively small and, therefore, generally go unnoticed for a long period of time. Only when a major leak develops in an underground bulk storage tank or in the supply lines or fuel lines, is the leak normally detected. Correction of a leak in such systems then requires the high cost of excavating the fuel storage tanks and/or supply pipes or delivery pipes and replacing them.

Environmental concerns have led to the development of bulk fuel storage tanks made of fiberglass instead of steel; but even when fiberglass tanks are buried along with buried supply lines and delivery lines, leaks develop in the supply lines and delivery lines, resulting in undesired contamination and expensive replacement and clean up costs.

Early efforts to prevent contamination from leakage from bulk storage tanks and fuel lines at gasoline filling station locations included burying the tanks and the various fill and delivery lines in gravel “ballast” after first lining the excavations with a plastic membrane before the ballast is installed. Theoretically, any leakage or spillage then is collected in the ballast in the bottom of a basin, which is formed by the membrane. Installation of membrane is relatively easy when the excavation initially is made, since the walls of the pit of the excavation provide support for the membrane. Fuel which has been spilled, however, typically cannot be removed from the ballast; and if a fuel leak of sufficient size exists, it still is necessary to employ costly excavation in order to dig up the tank or the leaking supply or delivery lines. It also should be noted that small holes may be formed in the membrane, which then permits the leaking hydrocarbon fluid to pass through the membrane into the underlying ground. Consequently, ground water contamination still can take place with such a system, and may go undetected for long periods of time.

The U.S. patent to Wagner U.S. Pat. No. 4,787,772 is directed to a device for detecting leaks in underground fluid tanks. In this patent, a drain pipe is located directly beneath the underground storage tank. This pipe then is connected to a sump which includes a leak detector and a pump for removing leaking fluid. The problem with the system disclosed in Wagner, however, is that the tank and supply lines and fuel delivery lines all are buried in the ground; so that ground water contamination still can take place. In addition, the above noted expense of excavation for replacement or repair necessarily is incurred whenever leaks occur.

Efforts to overcome ground water contamination from underground bulk storage tanks are disclosed in the U.S. patent to Moreland U.S. Pat. No. 4,682,911; Moreland U.S. Pat. No. 4,818,151; Gage U.S. Pat. No. 4,934,866; and Heintzelman U.S. Pat. No. 5,030,033. All of these patents include vaults or secondary containment devices for underground storage tanks. In the systems of all of these patents, the underground storage tanks are contained within an enclosing vault designed to receive and contain any leaks from the underground storage tanks. In all of these systems, however, pipes connecting the tanks to the pumps or filler pipes are buried in separate trenches. The pipes are directly buried underground or in a separate tunnel. The supply or filler pipes and the fluid delivery pipes, however, are not contained within the secondary containment vault in which the fuel tanks are located.

The U.S. patent to Killman U.S. Pat. No. 4,978,249 also discloses a secondary containment system or vault for bulk fuel storage tanks. In the patent to Killman, the tanks are located within the secondary containment vault. A covered trench or a “chase” then is used to convey electricity and fuel delivery pipes from the tanks contained inside the secondary containment vault to the fuel pump islands. If a leak occurs in any of the delivery pipes, access into the trench or chase into which the delivery pipe is located must be made, either by excavating the pipes or, if the chase is sufficiently large, by crawling through the chase to repair or replace a leaking pipe.

Whenever any part of a fuel storage and delivery system is buried in the ground without a fully effective secondary containment system, possible contamination from leakage exists. In the United States, government regulations have been enacted which impose a tax on each gallon of fuel delivered by such systems as a contribution to a contamination clean up fund. In addition to the burden of this extra expense, careful reports are required by the government to account for all fuel supplied to a system and delivered from that system to ensure leaks are not occurring. Periodic tank testing has been required; and in many cases, filling station owners are required to purchase tank insurance against possible ground water contamination.

It is desirable to provide a bulk fuel storage and delivery system which overcomes the disadvantages of the prior art, which is one hundred percent contained within a secondary containment system, and which eliminates the burdensome government requirements imposed on prior art systems.

SUMMARY OF THE INVENTION

It is an object of this invention to provide an improved containment system for a bulk fuel storage and delivery system.

It is another object of this invention to provide an improved, fully contained fuel storage and dispensing system.

It is an additional object of this invention to provide an improved secondary containment system for a fuel storage and dispensing system in which all fuel lines and storage tanks are enclosed within a single below-grade secondary containment vault.

It is a further object of this invention to provide an improved below-grade fuel storage and dispensing system in a fully enclosed vault, with all pipes leading to and from the vault passing upwardly through the vault top.

In accordance with a preferred embodiment of this invention, a below-grade fuel storage and delivery system includes a fluid-tight vault with a floor, side walls and a roof. The roof can be located at ground level. A bulk fuel storage tank is located within the vault; and a fill pipe for the tank passes through the roof of the vault to the tank. A fuel dispenser is located, at least in part, on the roof of the vault, with a fuel delivery line connected through the roof of the vault between the bulk storage tank and the fuel dispenser; so that the fill pipe, the delivery line and the bulk fuel storage tank all are located within the same vault.

DETAILED DESCRIPTION

Figure 1:
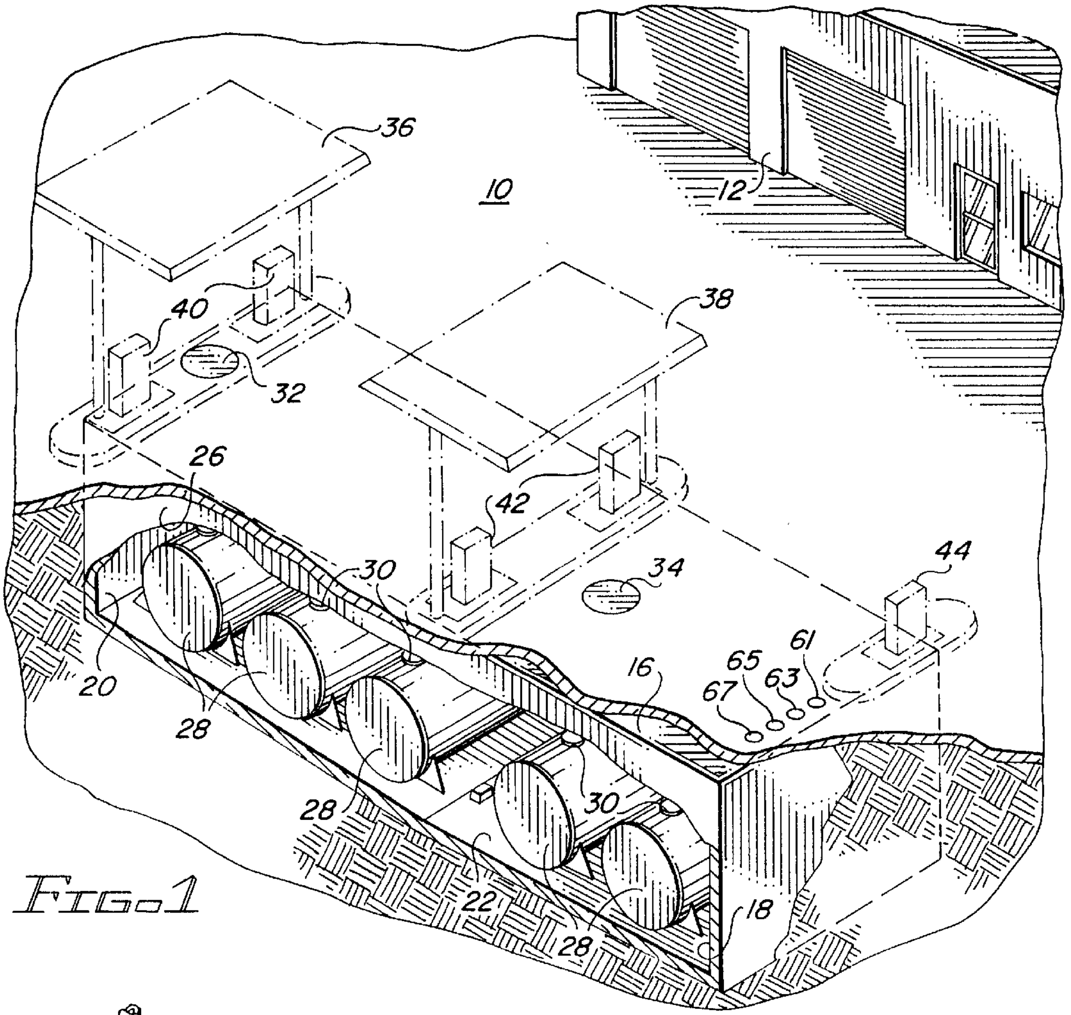
FIG. 1 is a partially cut-away, top, perspective view of a preferred embodiment of the invention.

Reference now should be made to the drawings, in which the same reference numbers are used throughout the different figures to designate the same or similar components. FIG. 1 is a partially cut away perspective view of a fluid storage and delivery system according to a preferred embodiment of the invention. The system which is shown is particularly suited for use in conjunction with a gasoline filling station location 10 associated with a static above-ground structure 12. The structure 12 may be a convenience market or repair shop, or a factory associated with fuel which is stored and dispensed at the location 10.

As shown in FIG. 1, a below-grade secondary containment vault consisting of a floor 22 end walls 18 and 20, and front and back walls 24 and 26, is constructed in an excavation at the site. The floor 22 and the end and side walls preferably are made of concrete or reinforced concrete, which is sealed with a fuel resistant sealant (capable of resisting hydrocarbon fuels) at least to a level on the end walls 18 and 20 and the side walls 24 and 26 to a height comprising the containment line in the event of fuel spills occurring within the secondary containment vault. The vault itself is closed at the top by a reinforced concrete roof 16, which then may be employed directly as part of the driveway over the containment vault, or which further may be paved over, if desired.

As shown in the various drawings, five cylindrically shaped fuel tanks 28 are located in a side-by-side relationship within the enclosure formed by the various components of the secondary containment vault. Typically, these tanks are made of steel; and they are mounted on tank saddles 29 (most clearly shown in FIG. 4) to raise the bottoms of the tanks above the floor 22 of the containment vault. The tanks 28 are of relatively large size, on the order of 8,000 to 12,000 gallons, for use in conjunction with a typical gas station or service station. As is readily apparent from an examination of the various figures, space is provided under, over and on all sides of the tanks for permitting a person to enter the vault to inspect the tanks as needed.

To permit access to the tanks 28 through the roof 16 of the containment vault, a pair of manhole covers 32 and 34 are provided, with ladders 33 and 35 (shown in FIG. 5) descending from the covers to the floor 22 of the vault. Consequently, whenever manual inspection of the tanks and pipes in the vault is desired, ready access is provided through the manhole openings 32 and 34 in the roof 16 of the vault.

Figure 2:
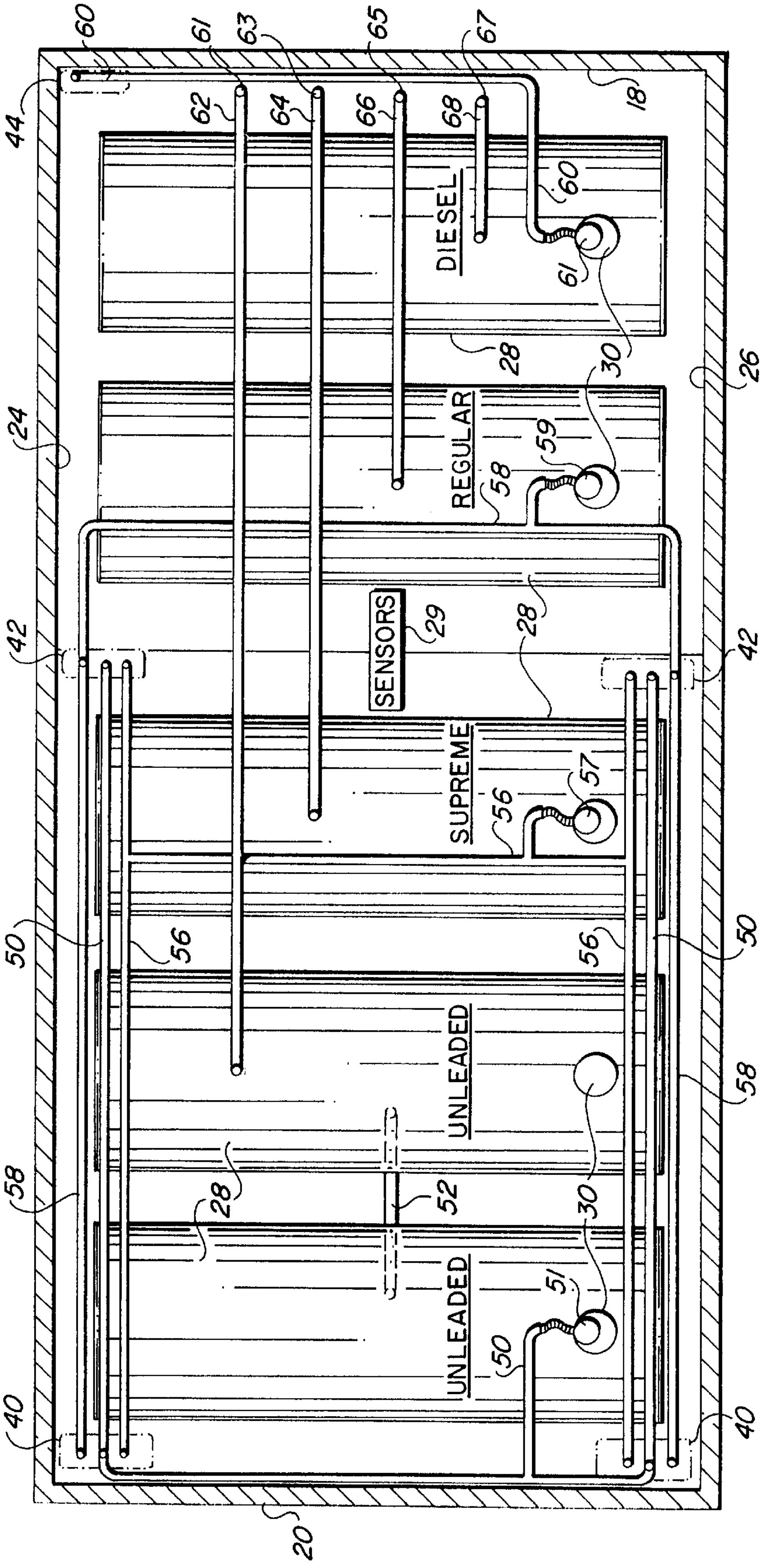
FIG. 2 is a top view illustrating details of the embodiment shown in FIG. 1.

It has been found that the majority of contaminating leaks, from service stations and fuel delivery systems occur from the fuel lines and not from the tanks, such as the tanks 28. As a consequence, the system shown in the drawings is designed to cause all of the fuel lines for filling the tanks 28 and for dispensing fuel from the tanks 28 to be located within the interior of the vault. No fuel lines extend externally from the vault, except when they pass upwardly directly through the roof 16. Consequently, if any leaks occur in any of the fuel lines, those leaks are contained within the vault shown in FIG. 1. To accomplish this, the fill lines for the five tanks 28, as illustrated in FIGS. 1 and 2, are accessed through fill openings 61, 63, 65 and 67 located through the roof 16 at the right-hand end, as viewed most clearly in FIGS. 1 and 2. These four different fill lines are capped at the ground surface in a conventional manner to close them off whenever fuel is not being supplied to one or more of the tanks 28.

As shown in FIG. 2, the fill openings 61, 63, 65 and 67 are connected to respective fuel fill lines 62, 64, 66 and 68 located within the vault. Also as shown in FIG. 2, the left-hand two tanks 28 are designated as "unleaded", with the other tanks holding "supreme", "regular" and "diesel" fuel, respectively. For fuels used in greater quantities, such as "unleaded" gasoline, one or more tanks may be bridged together, as with the bridge line 52 interconnecting the bottoms of the two left-hand tanks 28, as shown in FIG. 2. As a result, the fuel fill line 62 is only connected into one of these two tanks, since filling this tank will fill both tanks through the bridge 52. All of the fill lines 62, 64, 66 and 68 slop downwardly toward the tops of their respective tanks 28 from the above ground fill positions 61, 63, 65 and 67, respectively.

Figure 4:
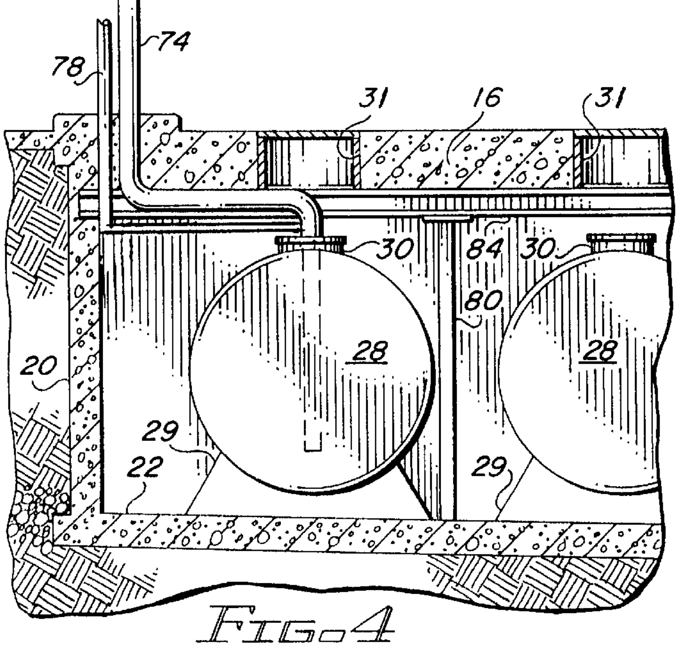
FIG. 4 is a partially cut-away side view of a portion of the embodiment shown in FIG. 1.
Figure 5:
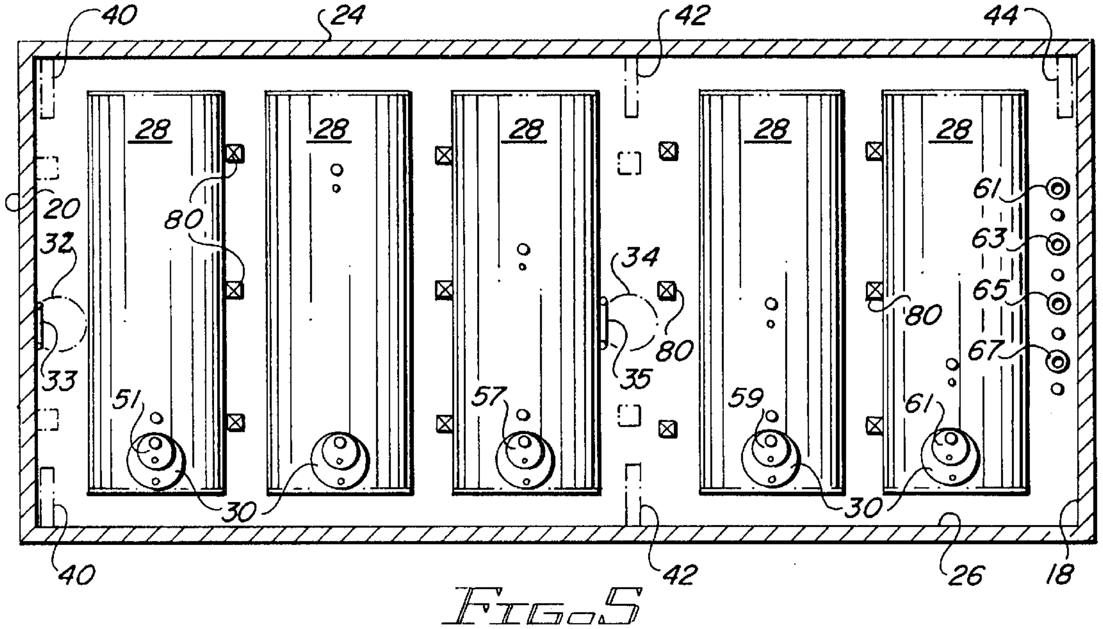
FIG. 5 is another top view showing additional details of the structure of the embodiment of FIG. 1.

An important feature of the system which is shown in the drawings is the location of the fuel dispenser pumps directly over the roof 16 of the containment vault. This is illustrated in FIGS. 1, 2 and 5 by showing the fuel dispensers 40, 42 and 44 at various locations near the ends and edge of the roof 16 of the containment vault. As is readily apparent from an examination of FIG. 1, vehicles will travel over the roof 16 of the containment vault; so that it necessarily is made of reinforced concrete. In FIG. 4, one of several I-beams 84, which provide support for the roof 16, is indicated; and as shown in FIGS. 4 and 5, a number of vertical support posts 80 are employed to support the I-beams 84 which stretch across the vault to provide the underlying support for the roof 16. The roof 16 may be constructed in any suitable manner designed to carry the weight of a number of vehicles passing over and parked on top of it while those vehicles are being filled with fuel from any one of the dispensers 40, 42 and 44.

FIG. 2 also shows the fuel lines for supplying fuel from the various tanks to the dispensers 40, 42 and 44 located above them and indicated in dotted lines in FIG. 2. Each of the tanks 28 (or groups of tanks for the case of the two left-hand "unleaded" tanks) is provided with a pump 51, 57, 59 and 61, which is accessible through a tank access 31, as illustrated most clearly in FIGS. 1, 2, 4 and 5. The manner of operation of these various pumps 51, 57, 59 and 61 is conventional; and the pumps supply fuel over supply lines 50, 56, 58 and 60, as indicated in FIG. 2. In the situation where fuel is to be supplied to more than one of the dispensers, such as the dispensers 40 and 42, the lines are interconnected by appropriate fittings to provide fuel to all of these locations as shown in FIG. 2. As illustrated in FIG. 2, the small circles in the lines 50, 56, 58 and 60 located beneath the dotted areas 40, 42 and 44 represent the vertical rise of the fuel delivery lines to the bottoms of the dispensers 40, 42 and 44. Consequently, ready access to the fuel supply lines for each of the dispensers is obtained from within the vault if repair or replacement of any of these lines should be necessary.

Figure 3:
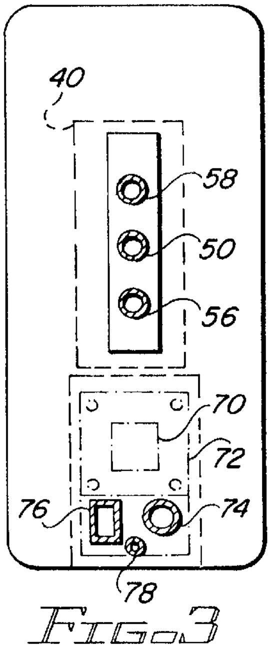
FIG. 3 is a top detail view of a portion of the embodiment shown in FIGS. 1 and 2.

FIG. 3 is a diagrammatic drawing of the top of an island curb, showing one of the fuel dispensers 40, with the vertical fuel lines 50, 56 and 58 which are supplied to this dispenser. In addition, a support column 70 (which may typically be a 10" by 10" column) is supported on a bottom plate 72 located on the dispenser island curb. Also provided for the vault is an exhaust duct 76 and an emergency ventilation vent 74 (typically eight inches) through the top of the canopy, such as 36 or 38, shown in FIG. 1. Another tank vent 78 (typically two inches) is shown in FIGS. 3 and 4.

Figure 6:
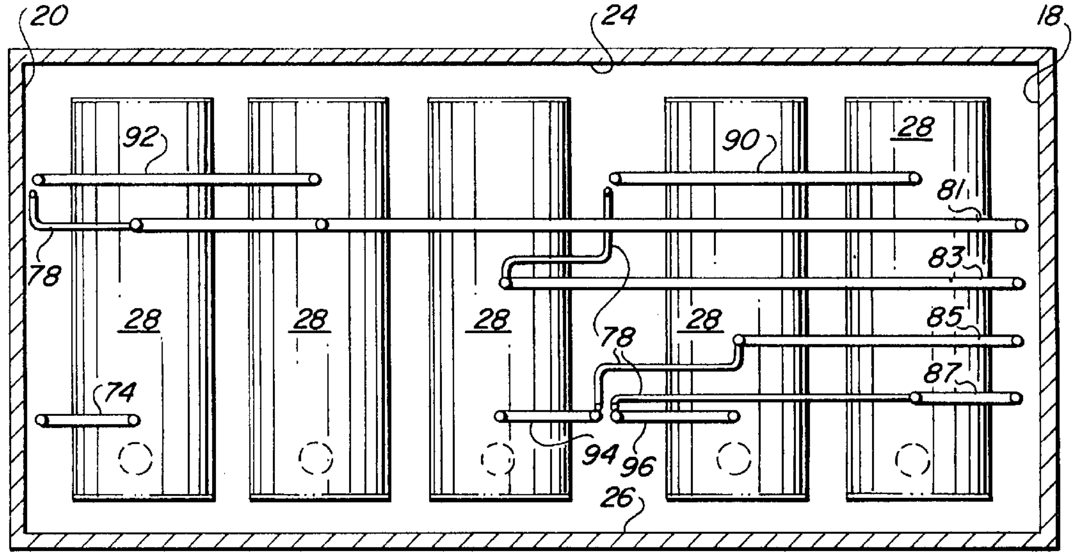
FIG. 6 is a third top view illustrating additional features of the embodiment shown in FIG. 1.

Additional venting or vapor adapters are employed with the system, again, with all of the plumbing located within the vault beneath the roof 16, as shown in FIG. 6. FIG. 6 is directed to a diagrammatic layout of vapor vents or adapters connected by means of pipes 81, 83, 85 and 87 to the various tanks. As shown in FIG. 6, emergency vents 74, 94 and 96 also are supplied and operate in a conventional manner. It should be noted that all of the pipes which are shown in FIGS. 2 and 6 are present in the system simultaneously; and the two different figures are used in order to avoid unnecessary cluttering of either of these figures. In actual practice, all of the pipes of both of these figures are located in the relative positions shown at the same time in the finished system.

As is readily apparent, the system which is shown in the drawings and described above is a one-hundred percent vaulted or contained system in which the bulk storage tanks, as well as the fuel fill and delivery pipes and vent pipes, are located within the vault. No additional buried pipes are employed. If necessary, manways can be connected to the vault for delivery pipes to remote dispensers in large service station configurations. All of the plumbing, fill, vapor recovery pipes and the storage tanks themselves are accessible from the vault. The pumps 51, 57, 59 and 61 are located on the tank covers 30; so that ready repair or replacement of these pumps from within the vault readily may be effected.

Also, if a leak ever should develop in any of the bulk storage tanks 28, the floor of the vault 22 is sloped toward a central position where sensors 39 are located for detecting the presence of any fluids and particularly, the presence of hydrocarbon fluids; so that immediate attention may be directed to the repair of any such leaks.

If any of the tanks 28 ever should develop a leak, the tank easily can be accessed from inside the vault and fiberglassed; so there is no necessity for ever removing any of the tanks 28 from the vault or secondary containment vessel formed by the floor 22 and walls 18 and 20, side walls 24, 26 and roof 16.

A mechanical ventilation system (not shown) is used to provide air changes through the exhaust ducts 76 to provide continuous positive pressure air changes at all times. Alarms may be employed to indicate a failure of the ventilation system; and other conventional safety equipment may be employed in conjunction with the system which has been described.

The foregoing description of the preferred embodiment of the invention should be considered as illustrative and not as limiting. Clearly, the number of tanks, the size of the tanks 28 and the material out of which the tanks 28 are manufactured may be varied in accordance with the particular requirements of the location with which the system is being used. The containment vault and the inclusion of all of the fill, delivery and ventilation pipes within the vault may be accomplished in different arrangements from the ones which have been indicated in the drawings and described above. Various other changes and modifications will occur to those skilled in the art for performing substantially the same function, in substantially the same way, to achieve substantially the same result without departing from the true scope of the invention as defined in the appended claims.

What is claimed is:

1. A below grade fuel delivery and storage system including in combination:

a fluid-tight vault having a floor, side walls and a roof;

at least one bulk fuel storage tank located entirely within said vault;

a fill pipe for said fuel storage tank located entirely within said vault except for a portion extending through and above said roof of said vault;

a fuel dispenser located at least in part over said roof of said vault; and a fuel delivery line located entirely within said vault except for a portion extending through said roof of said vault between said bulk fuel storage tank and said part of said fuel dispenser located over said roof of said vault; so that fuel spills from said tank, said fill pipe and said delivery line all are contained within said vault.

2. The combination according to claim 1 further including vent lines located within said vault and passing upwardly through said roof thereof.

3. The combination according to claim 2 wherein said vault is constructed of concrete, the surfaces of which are treated to provide a fluid-tight seal.

4. The combination according to claim 3 wherein said bulk storage tank is supported on the floor of said vault by support members holding said tank above said floor of said vault.

5. The combination according to claim 4 wherein said bulk storage tank is spaced from said side walls by an amount selected to permit inspection of said tank from all sides from within said vault.

6. The combination according to claim 5 further including at least one access cover in the roof of said vault for facilitating ingress and egress of a person into and out of said vault.

7. The combination according to claim 6 further including fuel spill sensors located within said vault.

8. The combination according to claim 7 wherein said vault is a substantially rectangular vault with first and second side walls and first and second end walls supporting said roof.

9. The combination according to claim 8 wherein said at least one tank comprises a plurality of bulk fuel storage tanks, with each of said tanks having a fill pipe and with each of said tanks having a fuel delivery line, all located entirely within said vault except for portions extending through and above said roof of said vault.

10. The combination according to claim 1 further including an access manhole through the roof of said vault with said tank, and wherein said fill pipe and said fuel delivery lines are located within said vault to permit access thereto for inspection and repair.

11. The combination according to claim 1 wherein said vault is a substantially rectangular vault with first and second side walls and first and second end walls supporting said roof.

12. The combination according to claim 11 wherein said vault is constructed of concrete, the surfaces of which are treated to provide a fluid-tight seal.

13. The combination according to claim 1 wherein said at least one tank comprises a plurality of bulk fuel storage tanks, with each of said tanks having a fill pipe and with each of said tanks having a fuel delivery line, all located entirely within said vault except for portions extending through and above said roof of said vault.

14. The combination according to claim 1 further including fuel spill sensors located within said vault.

15. The combination according to claim 1 wherein said bulk storage tank is supported on the floor of said vault by support members holding said tank above said floor of said vault.

16. The combination according to claim 15 wherein said bulk storage tank is spaced from said side walls by an amount selected to permit inspection of said tank from all sides from within said vault.

17. The combination according to claim 1 further including access covers in the roof of said vault for facilitating ingress and egress of a person into and out of said vault.

* * * * *